(12) United States Patent
Sung et al.

(10) Patent No.: US 8,295,489 B2
(45) Date of Patent: Oct. 23, 2012

(54) METHOD FOR SHARING A LINK KEY IN A ZIGBEE NETWORK AND A COMMUNICATION SYSTEM THEREFOR

(75) Inventors: Yeul-Tak Sung, Seoul (KR); Young-Seop Han, Suwon-si (KR); Jae-Ho Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 952 days.

(21) Appl. No.: 12/328,170

(22) Filed: Dec. 4, 2008

(65) Prior Publication Data

US 2009/0177889 A1 Jul. 9, 2009

(30) Foreign Application Priority Data

Dec. 4, 2007 (KR) .................. 10-2007-0124912

(51) Int. Cl.
*H04L 9/08* (2006.01)
*H04L 9/00* (2006.01)
*G06F 7/04* (2006.01)

(52) U.S. Cl. ............... 380/278; 380/277; 726/2; 726/21
(58) Field of Classification Search .................. None
See application file for complete search history.

(56) References Cited

U.S. PATENT DOCUMENTS

| | | | | |
|---|---|---|---|---|
| 5,991,293 | A * | 11/1999 | Buchanan et al. | 370/353 |
| 6,772,331 | B1 * | 8/2004 | Hind et al. | 713/151 |
| 6,882,854 | B2 * | 4/2005 | Kobayashi | 455/502 |
| 7,848,746 | B2 * | 12/2010 | Juels | 455/424 |
| 8,000,753 | B2 * | 8/2011 | Choi et al. | 455/569.1 |
| 2004/0073796 | A1 * | 4/2004 | Kang et al. | 713/171 |
| 2006/0159260 | A1 * | 7/2006 | Pereira et al. | 380/44 |

OTHER PUBLICATIONS

Schneier, "Applied Cryptography", 1996, John Wiley and Sons, p. 48.*
Chan et al., "Key Distribution Techniques for Sensor Networks" from the book "Wireless Sensor Networks", 2004, pp. 277-303.*
Khan et al., "The Cost of Security: Performance of ZigBee Key Exchange Mechanism in an 802.15.4 Beacon Enabled Cluster", IEEE, 2006 pp. 876-881.*
Boyle et al., "Security Protocols fo ruse with Wireless Sensor Networks", Proceedings fo teh Third International Conference on Wireless and Mobile Communications, IEEE, 2007, pp. 1-6.*
Nguyen et al., "ZigBee Security Using Identity-Based Cryptography", ATC 2007, Springer-Verlag, 2007, pp. 3-12.*
Willig et al., "The Angel WSN Architecture", IEEE, 2007, pp. 633-636.*
Hyncica et al., On Security of PAN Wireless Systems, SAMOS 2006, LNCS 4017, Springer-Verlag, pp. 178-185.*
Mlsic et al., Performance of key distribution in 802.15.4 Beacon Enabled Cluster, 2007, IEEE, pp. 4357-4362.* Baronti et al., Wireless sensor networks: A survey on the state of the art and the 802.15.4 and ZigBee Standards, Computer Communications, Elsevier, pp. 1655-1695.*
ZigBee-Specification, ZigBee Standards Organization, Dec. 1, 2006.

* cited by examiner

*Primary Examiner* — William Powers
(74) *Attorney, Agent, or Firm* — The Farrell Law Firm, P.C.

(57) ABSTRACT

A communication system and method for securely and efficiently sharing a link key for security and authentication in a ZigBee network. Upon receipt of an access request from an end device, a trust center sends a public key to the end device, and upon receipt of the public key, the end device encrypts an arbitrary key using the public key, and sends the encrypted arbitrary key to the trust center. The trust center generates a link key using the arbitrary key, and sends the link key to the end device.

24 Claims, 7 Drawing Sheets

METHOD FOR SHARING A LINK KEY IN A ZIGBEE NETWORK AND A COMMUNICATION SYSTEM THEREFOR

PRIORITY

This application claims priority under 35 U.S.C. §119(a) to a Korean Patent Application filed in the Korean Intellectual Property Office on Dec. 4, 2007, and assigned Serial No. 2007-124912, the disclosure of which is incorporated herein by reference.

BACKGROUND OF THE INVENTION

1. Field of the Invention

The present invention relates to a communication system and method for securely and efficiently sharing a link key for security and authentication in a ZigBee network.

2. Description of the Related Art

In a ZigBee network, communication between a coordinator and an end device, between a router and an end device, or between an end device and an end device in one Personal Area Network (PAN) is performed using a link key based on a master key. Herein, the term "ZigBee" refers to ZIGBEE® specification-compliant networks, devices, communications, etc. In the ZigBee network, security and authentication between two devices is achieved by establishing a master key between the two devices and sharing authentication data. The devices should generate the same link keys using the established master key, and perform security and authentication by checking the generation of the same link keys. In this way, the conventional ZigBee network handles security and authentication using a symmetric key scheme.

However, the conventional scheme must share the master key necessary for generating a link key, or shared data on an off-line basis. If the devices share the master key on-line and generate a link key based thereon, when there is no data to share off-line, a third device may fraudulently generate and share the same link key by monitoring the link key generation process.

Meanwhile, the devices performing ZigBee communication in the ZigBee network should freely build and destroy a PAN with each other, without spatial restrictions. For example, when several PANs are generated in adjacent spaces and the PANs are grouped centering on the coordinator, each PAN may want to keep the security from other PANs. The conventional scheme cannot securely share the link key unless it establishes the master key off-line on a one-by-one basis. This may be inconvenient in that as the number of PANs formed by the coordinator increases, all of multiple devices connected thereto should establish the master key off-line. Therefore, there is a demand for a method capable of securely generating and sharing a link key, without having to establish the master key off-line.

SUMMARY OF THE INVENTION

Accordingly, the present invention has been designed to address at least the problems and/or disadvantages described above, and to provide at least the advantages described below. An aspect of the present invention is to provide a communication system and method for securely and efficiently sharing a link key for security and authentication in a ZigBee network.

In accordance with an aspect of the present invention, there is provided a communication system for sharing a link key in a ZigBee network. The system includes an end device for sending an access request to receive a public key, generating an arbitrary key, encrypting the arbitrary key using the public key, and sending the encrypted arbitrary key; and a trust center for sending the public key to the end device upon receipt of the access request from the end device, receiving the encrypted arbitrary key from the end device, and generating a link key using the arbitrary key.

In accordance with another aspect of the present invention, there is provided a method for sharing a link key by a trust center in a ZigBee communication network. The method includes, upon receipt of an access request from an end device, sending a stored public key to the end device, receiving an arbitrary key encrypted with the public key from the end device, decoding the encrypted arbitrary key using a private key which has been stored in association with the public key, generating a link key using the decoded arbitrary key, encrypting the generated link key using the decoded arbitrary key, and sending the encrypted link key to the end device.

In accordance with another aspect of the present invention, there is provided a method for sharing a link key by an end device in a ZigBee network. The method includes sending an access request to a trust center, receiving a public key from the trust center, generating an arbitrary key, encrypting the arbitrary key using the public key, sending the encrypted arbitrary key to the trust center, receiving an encrypted link key from the trust center, and decoding the encrypted link key using the arbitrary key.

In accordance with another aspect of the present invention, there is provided a method for sharing a link key by an end device that stores first authentication data and second authentication data in a ZigBee network. The method includes, upon receipt of a first link key from a trust center, generating a hash function using the received first link key, encrypting the second authentication data using the generated hash function, transmitting the first authentication data and the encrypted second authentication data to the trust center, receiving second authentication data from the trust center, determining whether the receive second authentication data is identical to the stored second authentication data, when the second authentication data is identical to each other, sending an authentication confirm response to the trust center, receiving a second link key and a network key from the trust center, and performing ZigBee communication using the received second link key and network key.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF PREFERRED EMBODIMENTS

Figure 1:
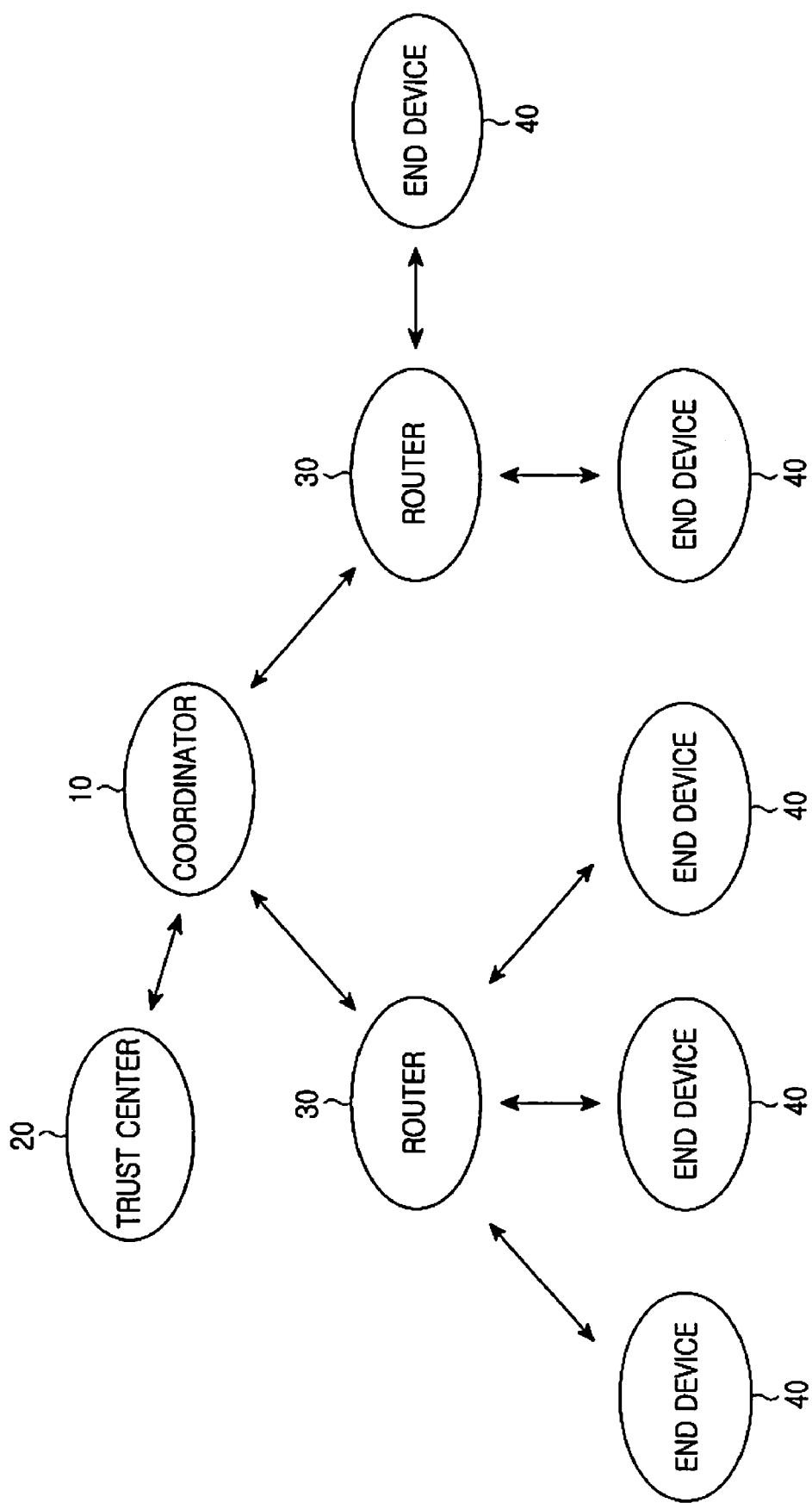
FIG. 1 is a diagram illustrating a communication system in a ZigBee network according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

FIG. 1 is a diagram illustrating a communication system in a ZigBee network according to an embodiment of the present invention. Referring to FIG. 1, the communication system includes a coordinator 10, two routers 30, a trust center (or authentication center) 20, and a plurality of end device(s) 40. The specific number of elements illustrated in FIG. 1, e.g., two routers 30 and five end devices, are provided only for illustrative purposes are not intended to limit the scope of the present invention.

The coordinator 10 forms the PANs within the system. The routers 30, which are connected to the end devices 40, deliver data received from the coordinator 10 to the end devices 40, and deliver data received from the end devices 40 to the coordinator 10. In addition, the routers 30 can enable data exchange between the end devices 40.

The trust center 20 authenticates the end devices 40 that request access to the PAN formed by the coordinator 10. Further, the trust center 20 sends a link key and a network key to each authenticated end device 40. Thereafter, end devices 40 can perform ZigBee communication with the coordinator 10, the router 30, or other end devices 40 in the PAN, using the link key and the network key.

Although the trust center 20 is illustrated as a separate device in this embodiment, the coordinator 10 or the router 30 may concurrently serve as the trust center 20 to authenticate each end device 40 in an alternative embodiment.

Figure 2:
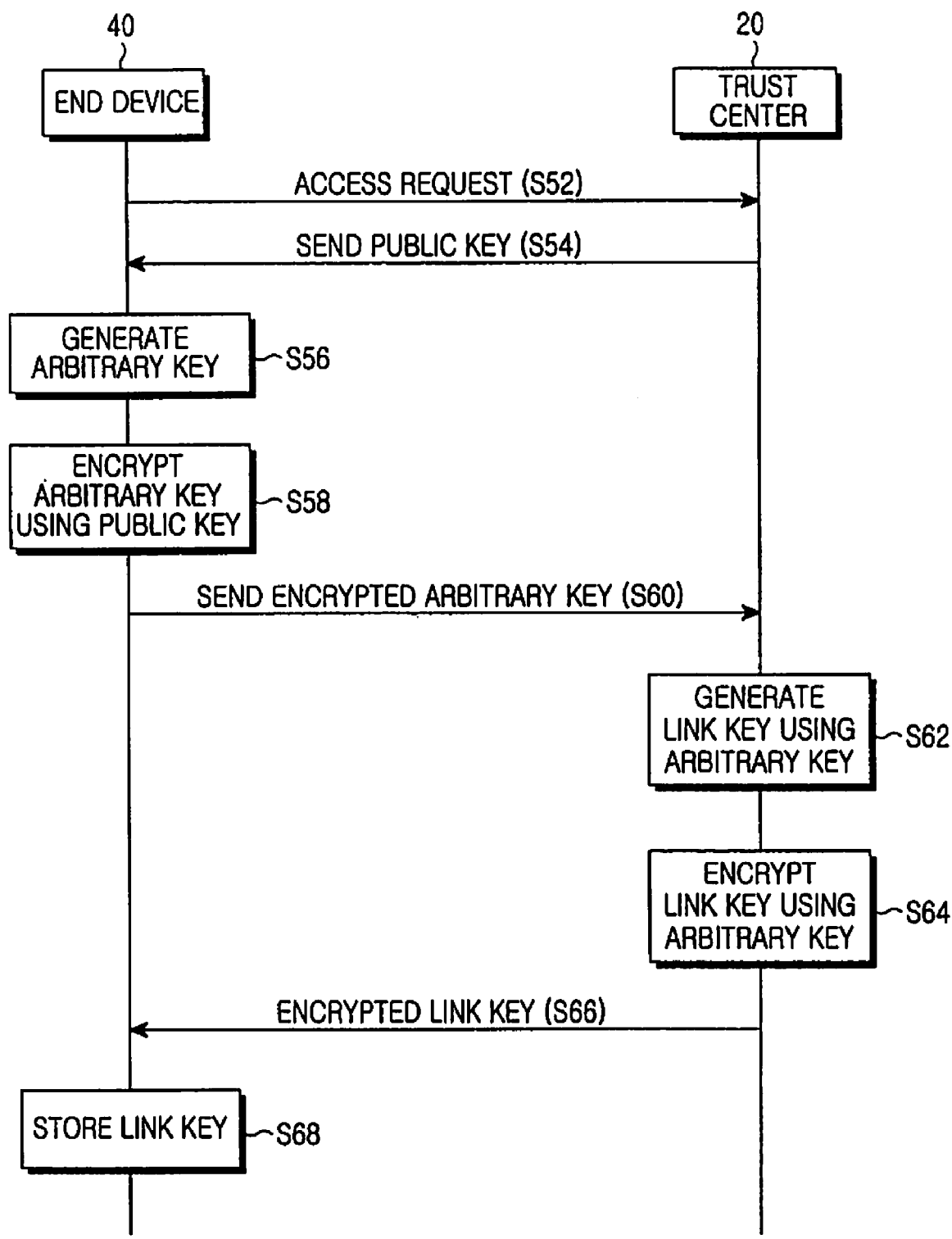
FIG. 2 is a flowchart illustrating a method for sharing a link key for security in a ZigBee network according to an embodiment of the present invention.

FIG. 2 is a flowchart illustrating a method for sharing a link key for security in a ZigBee network according to an embodiment of the present invention. Referring to FIG. 2, the end device 40 sends an access request to the trust center 20 as it accesses the PAN formed by the coordinator 10 in Step S52. Upon receipt of the access request from the end device 40, the trust center 20 sends a public key to the end device 40 in Step S54. According to an embodiment of the present invention, the trust center 20 has a public key and a private key corresponding to the public key.

According to an embodiment, sharing of the link key is achieved through a Rivest Shamir Adleman (RSA) scheme. More specifically, the trust center 20 distributes the public key to the end device 40, and the end device 40 generates an arbitrary key for generating a link key, and encrypts the generated arbitrary key with the public key. Although a value encrypted with the public key has the public key, it is not possible to decrypt the encrypted value if it does not have a private key corresponding to the public key. Therefore, only the trust center 20 having a private key corresponding to the public key can decrypt the arbitrary key encrypted with the public key.

Upon receipt of the public key from the trust center 20, the end device 40 generates an arbitrary key in Step S56. The arbitrary key indicates a value randomly generated by the end device 40, rather than indicating a key having a particular value. The trust center 20 encrypts the arbitrary key using the public key in Step S58, and then the end device 40 sends the arbitrary key encrypted with the public key to the trust center 20 in Step S60.

The trust center 20 receives the encrypted arbitrary key from the end device 40, and generates a link key using the received arbitrary key in Step S62. The arbitrary key encrypted using the public key can be decoded (or decrypted) using a private key previously stored in the trust center 20. The trust center 20 can identify the pure arbitrary key by decoding the encrypted arbitrary key with the private key.

The trust center 20 generates a link key using the arbitrary key in Step S62, encrypts the generated link key using the arbitrary key in Step S64, and sends the encrypted link key to the end device 40 in Step S66. Because the link key is a key encrypted using the arbitrary key generated by the end device 40, the end device 40, which already has the arbitrary key, can decode the encrypted link key using its arbitrary key. After acquiring a unique value of the link key by decoding the encrypted link key, the end device 40 stores the link key in Step S68. In this manner, the trust center 20 and the end device 40 share the link key.

Figure 3:
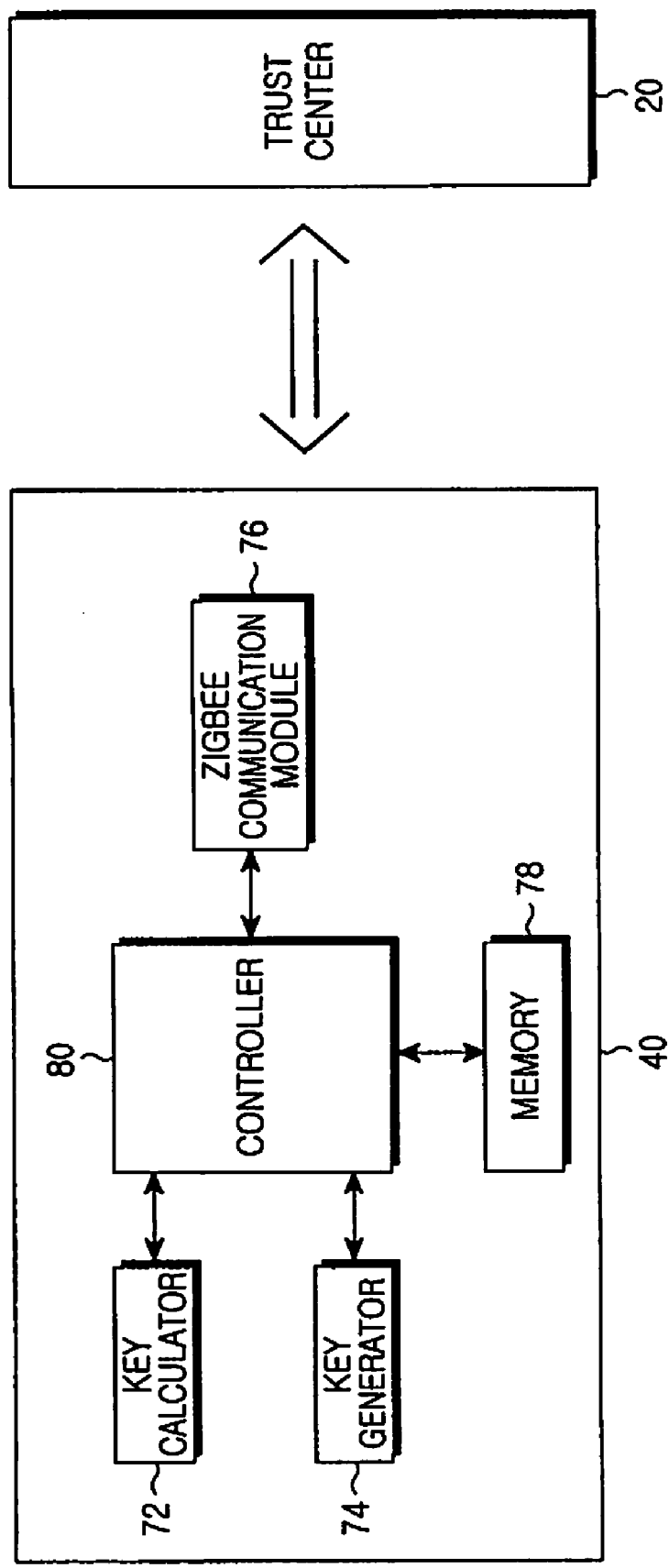
FIG. 3 is a block diagram illustrating a schematic structure of an end device in a communication system sharing a link key in a ZigBee network according to an embodiment of the present invention.

FIG. 3 is a block diagram illustrating a schematic structure of an end device in a communication system sharing a link key in a ZigBee network according to an embodiment of the present invention. Referring to FIG. 3, the end device 40 includes a key generator 74, a key calculator 72, a ZigBee communication module 76, a memory 78, and a controller 80. The key generator 74, under the control of the controller 80, generates an arbitrary key necessary for generating a link key. The arbitrary key indicates a key having a randomly generated predetermined value, rather than indicating a key having a particular value.

The key calculator 72, under the control of the controller 80, performs necessary calculation to generate a link key. The key calculator 72 decodes the key values received from the trust center 20, and/or encrypts the key values that will be sent to the trust center 20. When a public key is received from the trust center 20 via the ZigBee communication module 76, the key calculator 72 encrypts the link key generated by the key generator 74 using the received public key. In addition, upon receipt of a link key encrypted using the arbitrary key from trust center 20, the key calculator 72 decodes the encrypted link key.

The ZigBee communication module 76, also under the control of the controller 80, performs ZigBee communication in the PAN formed by the coordinator 10. The ZigBee communication module 76 receives a public key from the trust center 20, and sends the arbitrary key generated by the key generator 74 to the trust center 20. In addition, the ZigBee communication module 76 receives a link key encrypted with the arbitrary key from the trust center 20.

In the following authentication handling process between the trust center 20 and the end device 40, the ZigBee communication module 76 transmits first authentication data and encrypted second authentication data to the trust center 20, and receives second authentication data from the trust center 20. When the authentication for the trust center 20 is completed, the ZigBee communication module 76 sends an authentication confirm response to the trust center 20, and receives a link key newly generated by the trust center 20 and the network key.

The memory 78 can include a program memory and a data memory. The memory 78 stores various information necessary for a control operation for the end device 40. More specifically, the memory 78 stores the public key, the link key, and the network key, received from the trust center 20, and stores the arbitrary key generated from the key generator 74, and a hash function, which is a calculation algorithm necessary for data transmission/reception in the PAN. The hash function can be generated by the key generator 74 under the control of the controller 80. In addition, the memory 78 stores the first authentication data and the second authentication data for authentication between the trust center 20 and the end device 40.

When the end device 40 is a mobile communication terminal, for example, the first authentication data, which is a unique identifier of the end device 40, can be a phone number or a serial number. In addition, the second authentication data, which is an identifier stored in association with the first authentication data, can be a Mobile Identification Number (MIN), when the first authentication data is a phone number.

The controller 80 controls the overall operation of the end device 40. The controller 80 generates an arbitrary key by controlling the key generator 74, and controls the key calculator 72 to encrypt the arbitrary key using the public key received from the trust center 20. In addition, the controller 80 decodes the link key encrypted with the arbitrary key by controlling the key calculator 72.

In the authentication handling process between the trust center 20 and the end device 40, the controller 80 compares the second authentication data received from the trust center 20 with the second authentication data stored in the memory 78 to determine if the end device 40 has already been registered in the trust center 20. The controller 80 determines that the end device 40 has already been registered in the trust center 20, only when the second authentication data received from the trust center 20 is identical to the second authentication data stored in the memory 78.

In this embodiment, the end device 40 accesses the PAN in which it has already been registered. Therefore, the trust center 20 has already stored predetermined data for the end device 40, for example, the first authentication data or the second authentication data. Thus, if the second authentication data received from the trust center 20 is different from the second authentication data stored in the memory 78, the end device 40 can close its connection to the trust center 20, identifying that the end device 40 has accessed an incorrect trust center 20.

Although not illustrated in detail in the drawing, even the trust center 20, like the end device 40, can include a key generator, a key calculator, a ZigBee communication module, a memory, and a controller.

In the trust center 20, the key generator generates a link key and a network key. The key calculator encrypts the keys generated by the key generator, or decodes encrypted keys received from the end device 40. The ZigBee communication module performs ZigBee communication with the end device 40, and the memory stores an arbitrary key, a link key, first authentication data, or second authentication data, and a hash function, which is a calculation algorithm necessary for data exchange with the end device 40. The controller controls the key calculator, the key generator, the ZigBee communication module, and the memory, and upon receipt of the first authentication data or the second authentication data from the end device 40, the controller determines based thereon if the end device 40 is an authorized user. If the end device 40 is an authorized user, the controller controls the ZigBee communication module to transmit the second authentication data to the end device 40, and if the end device 40 is not an authorized user, the controller closes its connection to the end device 40. Here, the controller of the trust center 20 determines that the end device 40 is an authorized user, when the first authentication data and the second authentication data of the end device 40 are previously stored in the memory of the trust center 20.

Figure 4:
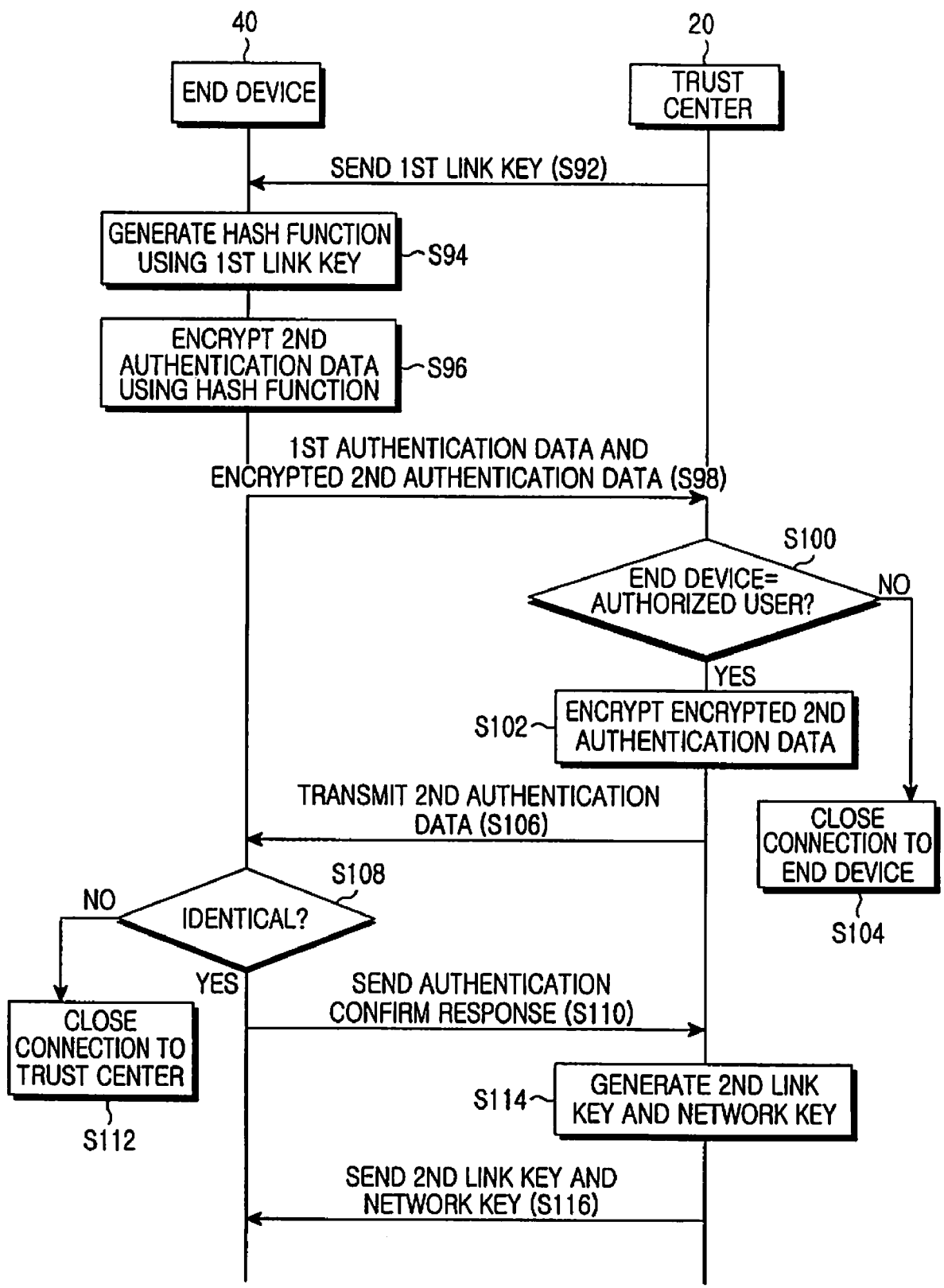
FIG. 4 is a flowchart illustrating a method for sharing a link key for authentication in a ZigBee network according to an embodiment of the present invention.

FIG. 4 is a flowchart illustrating a method for sharing a link key for authentication in a ZigBee network according to an embodiment of the present invention. Referring to FIG. 4, the trust center 20 sends a first link key to the end device 40 in Step S92. As described for FIG. 2, the end device 40 receives the first link key from the trust center 20 as follows.

When the end device 40 sends an access request to the trust center 20 as it accesses the PAN, the trust center 20 sends a public key to the end device 40. The end device 40 generates an arbitrary key, encrypts the generated arbitrary key with the public key, and sends it to the trust center 20. The trust center 20 generates a first link key using the arbitrary key received from the end device 40, encrypts the generated first link key with the arbitrary key, and sends it to the end device 40. The end device 40 receives the first link key and stores it in the memory 78.

The end device 40 generates a hash function using the first link key in Step S94. The hash function is for performing encryption on the necessary data before the end device 40 transmits predetermined data to the trust center 20. When the end device 40 is a mobile communication terminal, the end device 40, before transmitting a phone number of the mobile communication terminal to the trust center 20, can apply a hash function to the phone number and transmit a value calculated according thereto to the trust center 20. The hash function can be generated by including the first link key and CCM* (Enhanced counter with Cipher Block Chaining-Message Authentication Code (CBC-MAC) mode of operation).

The end device 40 encrypts the second authentication data using the hash function in Step S96. Herein, the first authentication data is a unique identifier by which it is possible to identify each end device 40, like the phone number, and the second authentication data is a predetermined value corresponding to the first authentication data. For example, if the end device 40 is a mobile communication terminal, the first authentication data is a phone number, and the second authentication data can be a MIN for the mobile communication terminal. The end device 40 first encrypts the second authentication data using the hash function generated with the link key to create a second hash function, and then encrypts the original second authentication data using the second hash function, i.e., the second authentication data encrypted with the hash function.

The end device 40 transmits the first authentication data and the encrypted second authentication data to the trust center 20 in Step S98. The trust center 20 determines if the end device 40 is an authorized user, depending on the first authentication data and the second authentication data received from the end device 40 in Step S100.

If the end device 40 is not an authorized user, the trust center 20 closes its connection to the end device 40 in Step S104. However, if the end device 40 is an authorized user, the trust center 20 transmits the second authentication data stored in the trust center 20 to the end device 40 in Step S102.

The end device 40 determines if the second authentication data received from the trust center 20 is identical to the stored second authentication data in Step S108. If they are not identical, the end device 40 closes its connection to the trust center 20 in Step S112. However, if they are identical, the end device 40 sends an authentication confirm response to the trust center 20 in Step S110.

The trust center 20 generates a second link key and a network key in Step S114, and sends the generated second link key and network key to the end device 40 in Step S116. Thereafter, the end device 40 performs ZigBee communication in the PAN using the second link key and the network key received from the trust center 20.

Figure 5A:
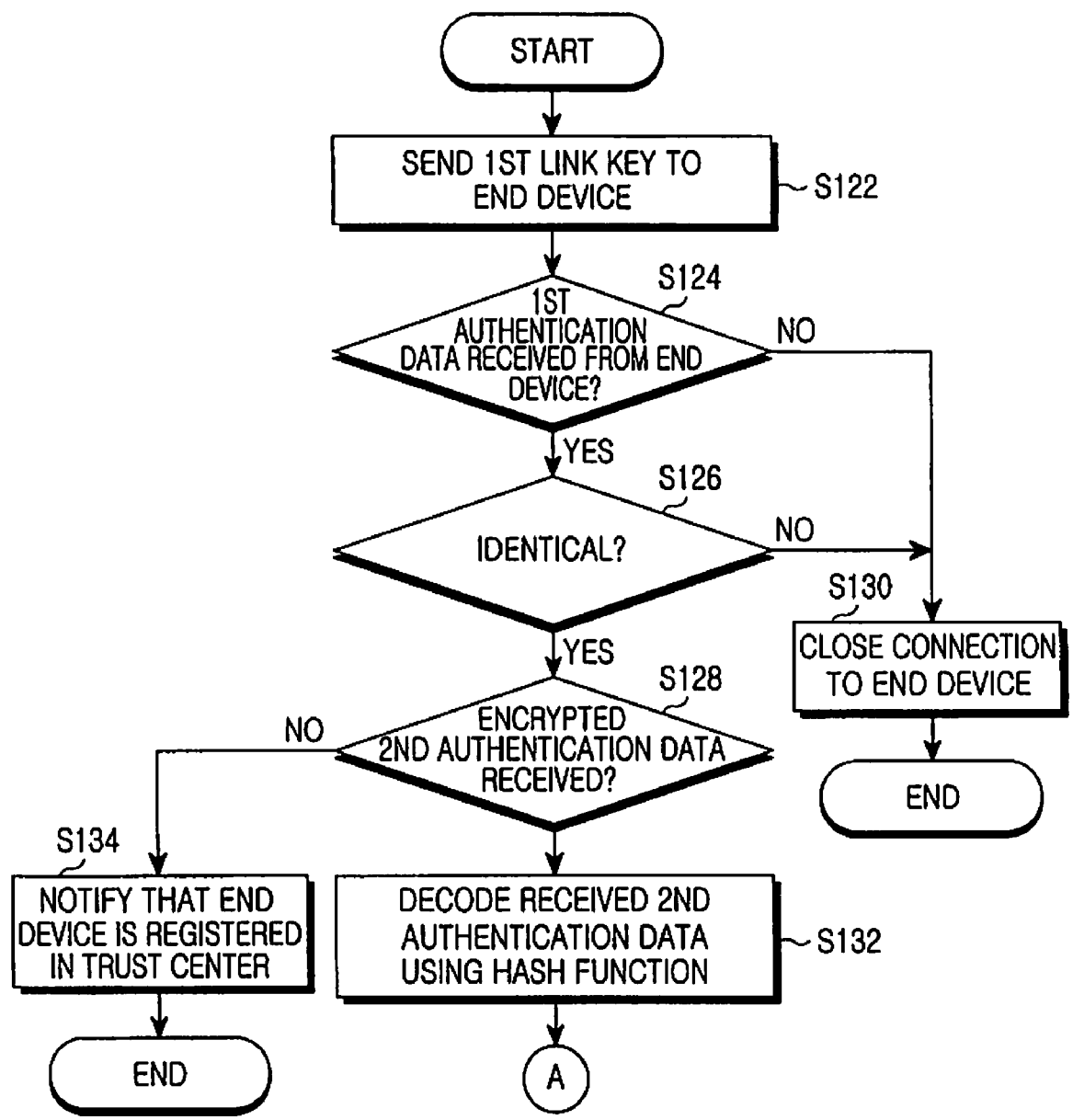
FIGS. 5A and 5B are flowcharts illustrating a method in which a trust center shares a link key for authentication in a ZigBee network according to an embodiment of the present invention.
Figure 5B:
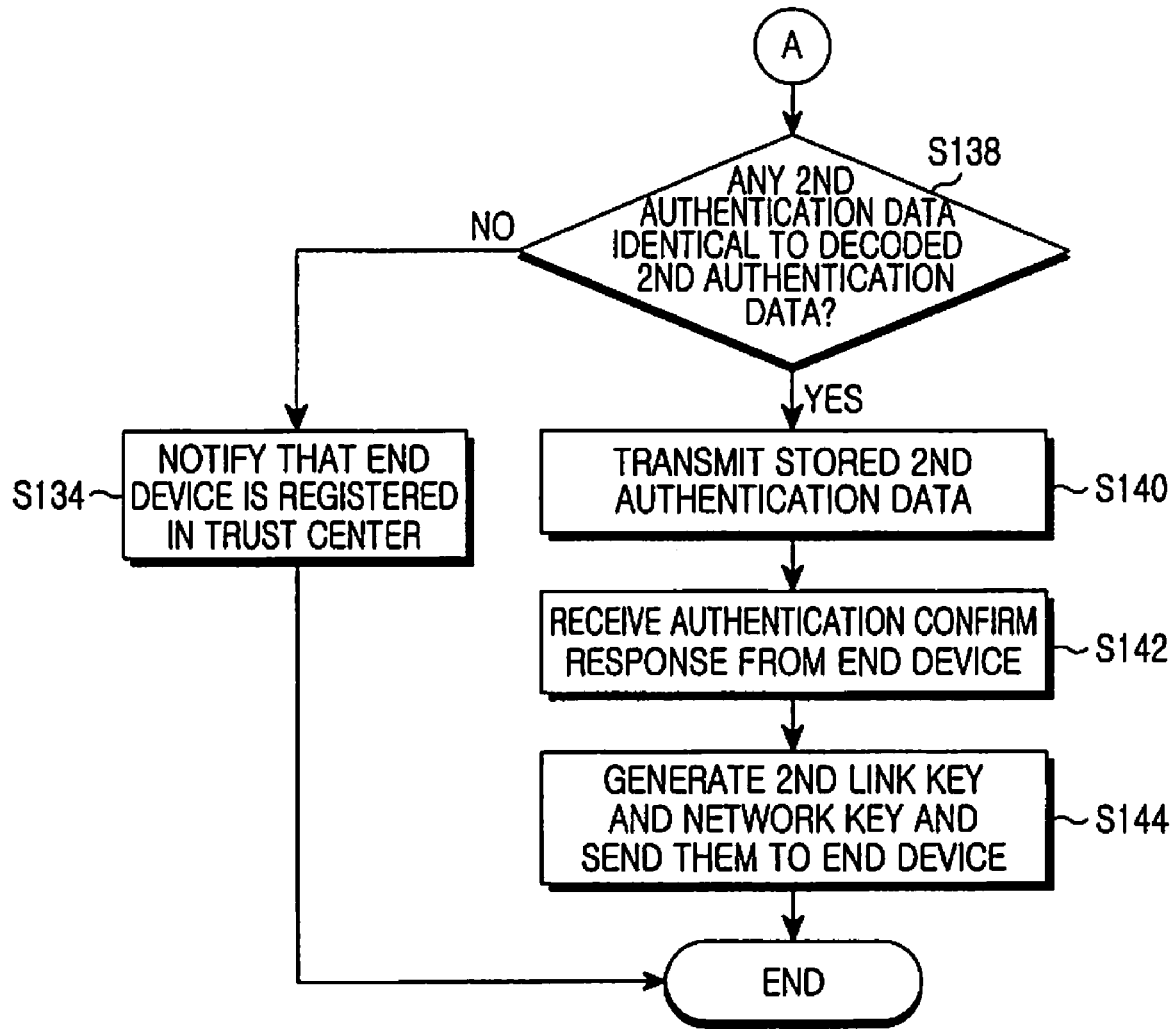

FIGS. 5A and 5B are flowcharts illustrating a method in which a trust center shares a link key for authentication in a ZigBee network according to an embodiment of the present invention. More specifically, FIGS. 5A and 5B illustrate a detailed operation of the trust center 20 during authentication between the trust center 20 and the end device 40 illustrated in FIG. 4.

It is assumed herein that the end device 40 has already been registered in the trust center 20, and the trust center 20 has already stored first authentication data and second authentication data for the end device 40. For example, the first authentication data is a phone number of the end device 40, and the second authentication data is a MIN. Also, it is assumed that the trust center 20 generates and stores a hash function using the first link key it shares with the end device 40.

Referring to FIG. 5A, the trust center 20 sends a first link key to the end device 40 in Step S122. The trust center 20 determines if it has received first authentication data from the end device 40 in Step S124. Upon failure to receive the first authentication data, the trust center 20 closes its connection to the end device 40 in Step S130. However, if it is determined that the trust center 20 has received the first authentication data from the end device 40, the trust center 20 determines if the first authentication data received from the end device 40 is identical to the stored first authentication data in Step S126.

In this embodiment, the trust center 20 authenticates only the end device 40 that has already been registered in the ZigBee network. The trust center 20 should know if the end device 40 that transmitted the first authentication data has already been registered in the ZigBee network. The trust center 20 can determine if the end device 40 is a registered end device 40, by checking if the first authentication data and the second authentication data, which are unique data for identifying each end device 40, have already stored in the trust center 20. The trust center 20 should store first authentication data for the end device 40 that has already been registered in the ZigBee network.

If the first authentication data received from the end device 40 is not identical to the stored first authentication data, the trust center 20 closes its connection to the end device 40 in Step S130. However, if the first authentication data received from the end device 40 is identical to the stored first authentication data, the trust center 20 determines if it has received encrypted second authentication data from the end device 40 in Step S128.

Upon failure to receive encrypted second authentication data from the end device 40, the trust center 20 notifies that the end device 40 is registered in the trust center 20 in Step S134. When no second authentication data is received, the trust center 20 cannot determine if the second authentication data of the end device 40 that transmitted the first authentication data is identical to the second authentication data stored in the trust center 20. In this case, the trust center 20 can only notify that the end device 40 is registered in the trust center 20, without performing the authentication procedure for the end device 40 any longer. That is, the end device 40 identifies that it has already been registered in the trust center 20, but the end device 40 cannot receive a second link key and a network key from the trust center 20. Therefore, the end device 40, which identifies only its registration/non-registration in the trust center 20, may have restrictions on ZigBee communication in the PAN.

Upon receipt of encrypted second authentication data from the end device 40, the trust center 20 decodes the received second authentication data using a hash function in Step S132. The encrypted second authentication data received from the end device 40 is encrypted using the first link key. Therefore, the trust center 20 can decode the second authentication data encrypted with the first link key using a hash function generated with the first link key, and determine if the decoded value is identical to the stored second authentication data.

At this point, the trust center 20 should determines if there is any second authentication data that matches to the decoded second authentication data.

Referring now to FIG. 5B, the trust center 20 determines if there is any second authentication data that is identical to the decoded second authentication data in Step S138. If there is no second authentication data being identical to the decoded second authentication data, the trust center 20 notifies that the end device 40 is registered in the trust center 20 in Step S134.

However, if there is second authentication data being identical to the decoded second authentication data, the trust center 20 transmits the stored second authentication data to the end device 40 in Step S140. In this way, the end device 40 can also determine if the second authentication data stored in the trust center 20 is second authentication data for the end device 40 itself. A more detailed description of this process will be given below with reference to FIG. 6.

The trust center 20 identifies that the end device 40 has already been registered in the trust center 20, by determining that the first authentication data is data that has already been stored in the trust center 20. In addition, the trust center 20 determines that the end device 40 that accessed it is an authorized user, by determining that the received second authentication data has already been stored in the trust center 20.

Upon receipt of an authentication confirm response for the trust center 20 from the end device 40 in Step S142, the trust center 20 generates a second link key and a network key, and sends them to the end device 40 in Step S144. At this time, the previously used first link key can be discarded.

Figure 6:
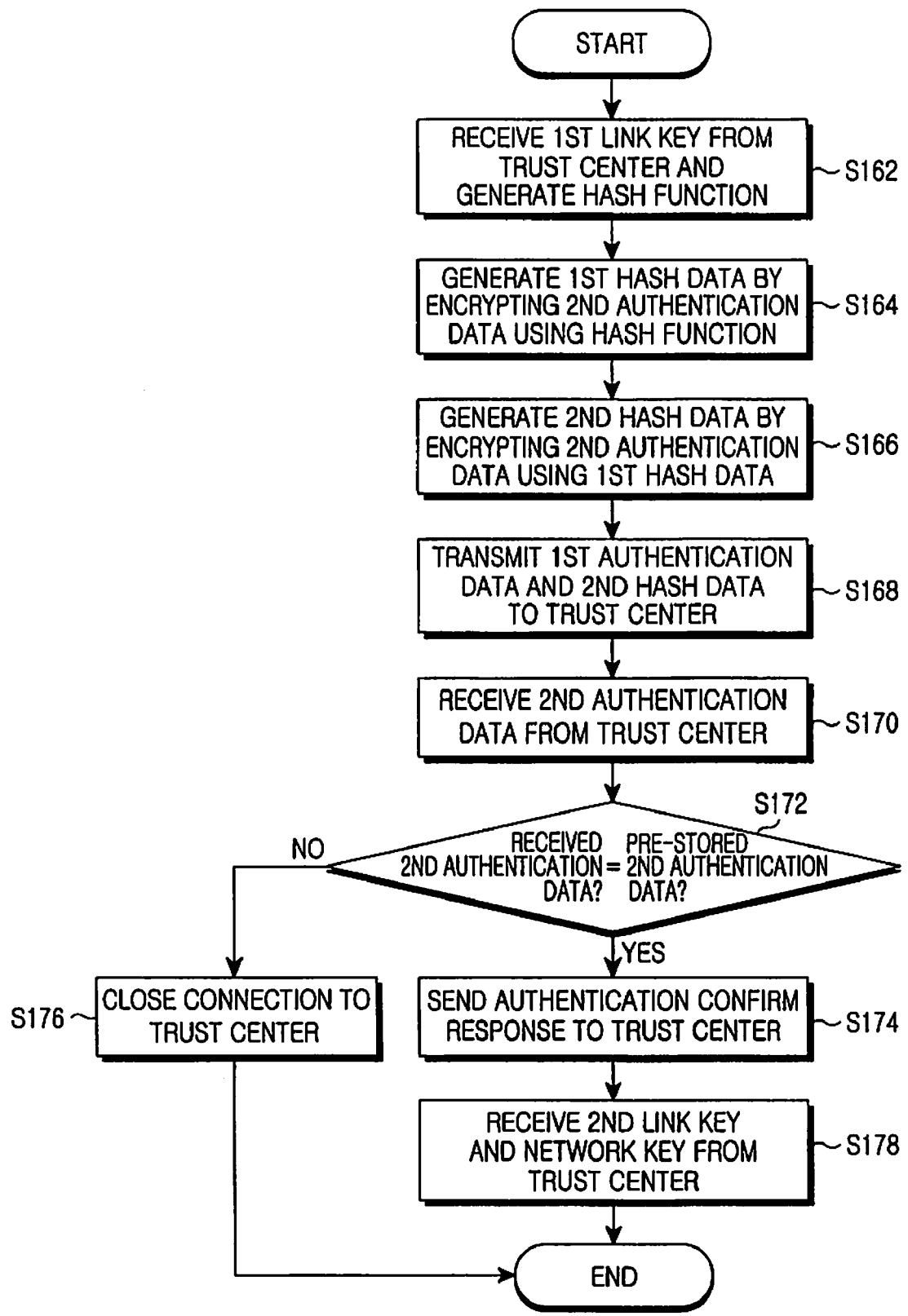
FIG. 6 is a flowchart illustrating a method in which an end device shares a link key for authentication in a ZigBee network according to an embodiment of the present invention.

FIG. 6 is a flowchart illustrating a method for an end device to share a link key for authentication in a ZigBee network according to an embodiment of the present invention. More specifically, FIG. 6 illustrates a detailed operation of the end device 40 during an authentication between the trust center 20 and the end device 40 as illustrated in FIG. 4.

It is assumed herein that the end device 40 has already been registered in the trust center 20, and the trust center 20 has already stored first authentication data and second authentication data for the end device 40. For example, the first authentication data is a phone number of the end device 40, and the second authentication data is a MIN.

Referring to FIG. 6, the end device 40 receives a first link key from the trust center 20, and generates a hash function using the received first link key in Step S162. The end device 40 encrypts second authentication data using the hash function to generate first hash data in Step S164, and encrypts the second authentication data using the generated first hash data to generate second hash data in Step S166. The end device 40 transmits the first authentication data and the second hash data to the trust center 20 in Step S168. The encrypted second authentication data, as described above for FIGS. 5A and 5B, corresponds to the second hash data. By transmitting the second hash data, the end device 40 can determine if it has already been registered in the trust center 20.

The trust center 20 decodes the second hash data, or encrypted second authentication data, while authenticating the end device 40. As described above with reference to FIGS. 5A and 5B, the trust center 20 determines if there is any second authentication data that is identical to the decoded second hash data, and if there is any, transmits the stored second authentication data to the end device 40. The end device 40 receives the second authentication data from the trust center 20 in Step S170.

The end device 40 determines if the second authentication data received from the trust center 20 is the stored second authentication data in Step S172. That is, the end device 40 determines if the received second authentication data is identical to the stored second authentication data. Like the trust center 20, the end device 40 has also already stored the first authentication data and the second authentication data. Therefore, the end device 40 can compare the second authentication data received from the trust center 20 with the stored second authentication data to determine if it has already been registered in the trust center 20. In this manner, the end device 40 performs authentication on the trust center 20 by comparing the second authentication data received from the trust center 20 with the stored authentication data.

If the second authentication data received from the trust center 20 does not match the stored second authentication data, the end device 40 closes its connection to the trust center 20 (Step S176).

However, if the second authentication data received from the trust center 20 matches the stored second authentication data, the end device 40 sends an authentication confirm response for the trust center 20 to the trust center 20 in Step S174, completing authentication on the trust center 20.

The end device 40 receives a second link key and a network key from the trust center 20 in Step S178. Thereafter, the end device 40 performs ZigBee communication in the PAN using the second link key and the network key.

As is apparent from the foregoing description, the present invention provides a communication system and method for securely and efficiently sharing a link key for security and authentication in a ZigBee network.

According to the present invention, there is no need to use the master key, as the trust center can generate a link key and share it with the end device without sharing the master key off-line.

As the present invention uses the public key scheme, only the trust center having a private key, which can decode an arbitrary key encrypted with the public key, can detect the arbitrary key received from the end device, making it difficult for other end devices to find out the link key, and thus contributing to an increase in security.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An end device for sharing a link key in a personal area network generated by a coordinator, the end device comprising:
 a communication module for sending an access request to a trust center, and receiving a public key from the trust center;
 a key generator for generating an arbitrary key; and
 a key calculator for encrypting the arbitrary key using the received public key,
 wherein the communication module receives a link key encrypted with the arbitrary key from the trust center, and the key calculator decodes the link key using the arbitrary key.

2. A trust center connected with a personal area network generated by a coordinator for sharing a link key, the trust center comprising:
 a memory for storing a public key and a private key corresponding to the public key;
 a communication module for sending the public key to an end device when an access request is received from the end device, and receiving an encrypted arbitrary key from the end device;
 a key calculator for decoding the arbitrary key encrypted with the public key using the private key; and
 a key generator for generating the link key for the end device using the decoded arbitrary key.

3. The trust center of claim 2, wherein the key calculator encrypts the generated link key using the decoded arbitrary key and a communication module sends the encrypted link key to the end device.

4. A method for sharing a link key by an end device in a personal area network generated by a coordinator, the method comprising:
 sending an access request to a trust center;
 receiving a public key from the trust center;
 generating an arbitrary key, and encrypting the arbitrary key using the public key;
 sending the encrypted arbitrary key to the trust center;
 receiving an encrypted link key from the trust center; and
 decoding the encrypted link key using the arbitrary key.

5. The method of claim 4, further comprising:
 receiving a first link key from the trust center;
 generating a hash function using the received first link key;
 encrypting a second authentication data using the generated hash function;
 transmitting a first authentication data and the encrypted second authentication data to the trust center;
 receiving another second authentication data from the trust center;
 determining whether the received another second authentication data is identical to the second authentication data;
 when the received another second authentication data is identical to the second authentication data, sending an authentication confirm response to the trust center;
 receiving a second link key and a network key from the trust center; and
 performing a communication using the received second link key and the received network key.

6. The method of claim 5, wherein encrypting the second authentication data comprises:
 encrypting the second authentication data using the hash function to generate first hash data; and
 encrypting the second authentication data using the first hash data to generate second hash data.

7. The method of claim 5, wherein encrypting the hash function using second authentication data comprises:
 encrypting the second authentication data using the first link key and a CCM* (Enhanced counter with Cipher Block Chaining-Message Authentication Code (CBC-MAC) mode of operation).

8. The method of claim 5, further comprising:
when the received another second authentication data is not identical to the second authentication data, closing a connection to the trust center.

9. A method for sharing a link key by a trust center in a personal area network, the method comprising:
receiving an access request from an end device;
sending a stored public key to the end device;
receiving an arbitrary key encrypted with the public key from the end device;
decoding the encrypted arbitrary key using a private key associated with the public key;
generating a link key using the decoded arbitrary key;
encrypting the generated link key using the decoded arbitrary key; and
sending the encrypted link key to the end device.

10. The method of claim 9, further comprising:
receiving first authentication data for the end device and encrypted second authentication data;
determining if the end device is an authorized user, depending on the first authentication data and the encrypted second authentication data; and
when the end device is an authorized user, generating a new link key and a network key, and sending the new link key and the network key to the end device.

11. The method of claim 10, further comprising:
closing a connection to the end device when the end device is not the authorized user.

12. The method of claim 10, wherein the first authentication data is a phone number or a serial number of the end device.

13. The method of claim 10, wherein the second authentication data is a Mobile Identification Number (MIN) of the end device.

14. The method of claim 10, wherein determining if the end device is the authorized user comprises:
determining if the first authentication data has been received from the end device;
when the first authentication data has been received, determining if the received first authentication data is identical to stored first authentication data;
when the received first authentication data is identical to the stored first authentication data, determining if the encrypted second authentication data has been received from the end device;
when the encrypted second authentication data has been received, decoding the encrypted second authentication data;
determining if the decoded second authentication data is identical to stored second authentication data; and
when the decoded second authentication data is identical to the stored second authentication data, transmitting the stored second authentication data to the end device.

15. The method of claim 14, further comprising:
closing a connection to the end device when the first authentication data is not received.

16. The method of claim 14, further comprising:
closing a connection to the end device when the received first authentication data is not identical to the stored first authentication data.

17. The method of claim 14, further comprising:
when the encrypted second authentication data is not received, notifying the end device that the end device has been registered.

18. The method of claim 14, further comprising:
when the decoded second authentication data is not identical to the stored second authentication data, closing a connection to the end device.

19. The method of claim 10, further comprising:
receiving an authentication confirm response from the end device before generating the new link key and the network key.

20. A trust center connected with a personal area network for sharing a link key, the trust center comprising:
a key generator for generating the link key and a network key;
a key calculator for encrypting the link key and the network key generated by the key generator, and decoding encrypted keys received from an end device;
a communication module for performing communication with the end device in the personal area network; and
a controller for controlling to send a stored public key to the end device upon receipt of an access request from the end device, to receive an encrypted arbitrary key using the public key from the end device, to decode the encrypted arbitrary key using a stored private key corresponding to the public key, to generate a link key using the decoded arbitrary key, to encrypt the generated link key using the decoded arbitrary key, and to send the encrypted link key to the end device.

21. The trust center of claim 20, wherein the controller controls to receive first authentication data and encrypted second authentication data for the end device from the end device, to determine whether the end device is an authorized user depending on the first authentication data and the encrypted second authentication data, to generate a new link key and a network key when the end device is an authorized user, and to send the new link key and the network key to the end device.

22. The trust center of claim 21, wherein the controller controls to close a connection to the end device when the end device is not the authorized user according to the result of the determination.

23. The trust center of claim 21, wherein the first authentication data is a phone number or a serial number of the end device.

24. The trust center of claim 21, wherein the second authentication data is a Mobile Identification Number (MIN) of the end device.

* * * * *